(12) United States Patent
Okubo et al.

(10) Patent No.: US 10,131,354 B1
(45) Date of Patent: Nov. 20, 2018

(54) ENGINE SPEED STABILIZATION

(71) Applicant: Ford Global Technologies, LLC, Dearborn, MI (US)

(72) Inventors: Carol Louise Okubo, Dearborn, MI (US); Kent Hancock, Ann Arbor, MI (US); Jacob Doan, Royal Oak, MI (US); Bryan Whitney D. Belt, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 15/596,667

(22) Filed: May 16, 2017

(51) Int. Cl.
    *B60W 30/18* (2012.01)
    *B60W 10/06* (2006.01)
    *B60W 10/08* (2006.01)
    *B60W 20/13* (2016.01)
    *F02D 11/02* (2006.01)

(52) U.S. Cl.
    CPC ...... *B60W 30/18136* (2013.01); *B60W 10/06* (2013.01); *B60W 10/08* (2013.01); *B60W 20/13* (2016.01); *F02D 11/02* (2013.01); *B60W 2510/244* (2013.01); *B60W 2540/10* (2013.01); *B60W 2710/0661* (2013.01); *B60W 2710/0666* (2013.01); *B60W 2710/083* (2013.01); *B60Y 2200/92* (2013.01); *Y10S 903/93* (2013.01)

(58) Field of Classification Search
    CPC .......... B60W 30/18136; B60W 20/13; B60W 10/08; B60W 10/06; B60W 2510/244; B60W 2710/083; B60W 2710/0666; B60W 2710/0661; B60W 2540/10; F02D 11/02; B60Y 2200/92; Y10S 903/93
    See application file for complete search history.

(56) References Cited

U.S. PATENT DOCUMENTS

| | | | |
|---|---|---|---|
| 8,244,420 B2 | 8/2012 | Shimohira et al. | |
| 8,326,510 B2 | 12/2012 | Tang et al. | |
| 8,634,939 B2 | 1/2014 | Martin et al. | |
| 2009/0299559 A1* | 12/2009 | Shimohira | B60K 1/02 701/22 |

\* cited by examiner

*Primary Examiner* — Yuen H Wong
(74) *Attorney, Agent, or Firm* — Brooks Kushman P.C.

(57) ABSTRACT

A vehicle includes an engine. The vehicle includes a controller configured to start a timer having a duration defined by a charge limit of a traction battery and during which the engine braking is maintained and reduce a predetermined rate of change speed limit of the engine is reduced. The starting of the timer is responsive to application of an accelerator pedal during engine braking. The controller is further configured to increase the predetermined rate of change speed limit such that engine braking is predicted based on the limit of the battery, responsive to application of an accelerator pedal during engine braking.

20 Claims, 4 Drawing Sheets

ENGINE SPEED STABILIZATION

TECHNICAL FIELD

The present disclosure relates to engine speed stabilization.

BACKGROUND

Vehicles may employ engine braking to supplement friction or regenerative braking. The negative torque provided by engine braking may be related, proportional or otherwise, to the speed of the engine. An accelerator pedal actuation may cause a vehicle system controller to reduce engine braking torque by reducing engine speed, which may change aural engine noises perceived by occupants of the vehicle. The changes in perceived noise may be distracting to vehicle occupants, especially when engine braking and engine propulsion sound similar.

SUMMARY

A vehicle includes an engine. The vehicle includes a controller configured to start a timer having a duration defined by a charge limit of a traction battery and during which the engine braking is maintained and reduce a predetermined rate of change speed limit of the engine is reduced. The starting of the timer is responsive to application of an accelerator pedal during engine braking. The controller is further configured to increase the predetermined rate of change speed limit such that engine braking is predicted based on the limit of the battery, responsive to application of an accelerator pedal during engine braking.

A vehicle includes an engine. The vehicle includes a controller configured to start a timer having a duration defined by a charge limit of a traction battery. The controller is configured to reduce a predetermined rate of change speed limit of the engine. The controller may start the timer and reduce the rate responsive to an accelerator pedal release during an acceleration of the engine. The controller is further configured to increase the predetermined rate of change of the threshold. The increase is responsive to expiration of the timer.

A vehicle includes an engine. The vehicle includes a controller configured to start a timer having a duration defined by a charge limit of a traction battery. The controller is configured to maintain a speed of the engine via a wheel torque of the vehicle and a reactionary force of a generator associated with the vehicle. The controller is further configured to increase the predetermined rate of change of the speed. The increase is responsive to expiration of the timer.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Combustion engines of hybrid electric vehicles may be used to slow the vehicle through engine braking. Various types of engine braking and hybrid electric vehicles are available and may be used. Engine braking may use inherent compression caused by stroking of the pistons and intrinsic frictional forces to resist engine rotation, thereby imparting negative torque to the powertrain.

Rotation of the engine may provide aural indication of vehicle operation to vehicle occupants. Meaning, occupants can glean vehicle acceleration characteristics from the noises made by the engine. Hybrid vehicles that employ engine braking, as discussed above, may confuse occupants because sounds caused by engine speed do not coincide with torques imparted on the power train or vehicle acceleration and deceleration. A timer may be implemented to reduce unsteady engine speeds and reduce confusion for vehicle occupants. The timer may be based on an engine braking prediction. The engine braking prediction may be based on roadway grade, battery charge limits, and other factors. Battery charge limits specify the amount of regenerative braking available. As charge limits decrease, based on a state of charge of the battery, regenerative braking capabilities are diminished. With diminished regenerative braking capacity, unstable engine speeds can be predicted because engine braking will be used, along with diminished regenerative braking capacity, to maintain vehicle speed while traveling down a slope having a grade requiring vehicle speed management.

Figure 1:
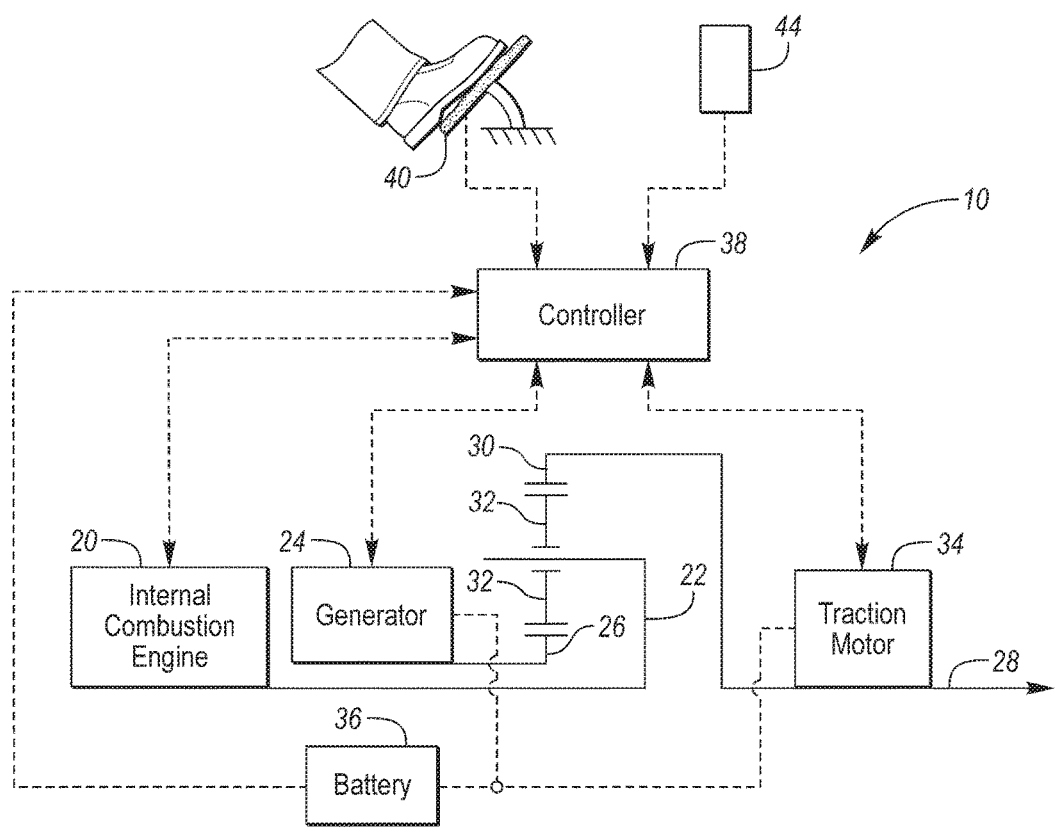
FIG. 1 is a schematic diagram of a hybrid vehicle.

A powertrain for a hybrid electric vehicle is illustrated schematically in FIG. 1. The powertrain includes an internal combustion engine 20 driveably connected to a planet carrier 22, a generator 24 driveably connected to a sun gear 26, and an output shaft 28 driveably connected to a ring gear 30. Elements are driveably connected when there is a mechanical power flow path between them such that the speeds of the elements are constrained to be substantially proportional. Planet carrier 22 supports a set of planet gears 32 such that each planet gear is in continuous meshing engagement with sun gear 26 and ring gear 30. Output shaft 28 drives the vehicle wheels directly or indirectly, such as via a differential assembly, for example.

Traction motor 34 is driveably connected to the output shaft 28. Both the generator 24 and the traction motor 34 are reversible electrical machines that are capable of converting electrical power into rotational mechanical power or converting rotational mechanical power into electrical power. The terms generator and motor should be regarded merely as labels for ease of description and does not limit the function or operation of either electrical machine. Generator 24 and traction motor 34 are both electrically connected to battery 36.

The rotational speed of sun gear 26, carrier 22, and ring gear 30 are linearly related such that speed of carrier 22 is a weighted average of the speed of sun gear 26 and ring gear 30. Consequently, the speed of the engine 20 is not constrained to be proportional to the speed of the output shaft 28 in this arrangement. Instead, the engine speed can be selected or controlled independently of the vehicle speed by setting the generator speed accordingly. Power flows from the engine to the output shaft through a combination of mechanical power transfer and electrical power transfer. During some operating conditions, the engine 20 can generate more power than what is delivered to the output shaft 28 with the difference, neglecting efficiency losses, delivered to battery 36. Under other operating conditions, the battery 36 in combination with generator 24 and/or traction motor 34 can supplement the power delivered by the engine 20 such that more power is delivered to the output shaft 28.

The engine 20, generator 24, and traction motor 34, all respond to control signals from controller 38. These control signals determine the amount of torque generated. The controller also receives speed signals from the engine 20, generator 24, and traction motor 34 and a state of charge signal from battery 36. The controller accepts input signals indicating driver intention from an accelerator pedal 40 and road grade detection 46.

Figure 2:
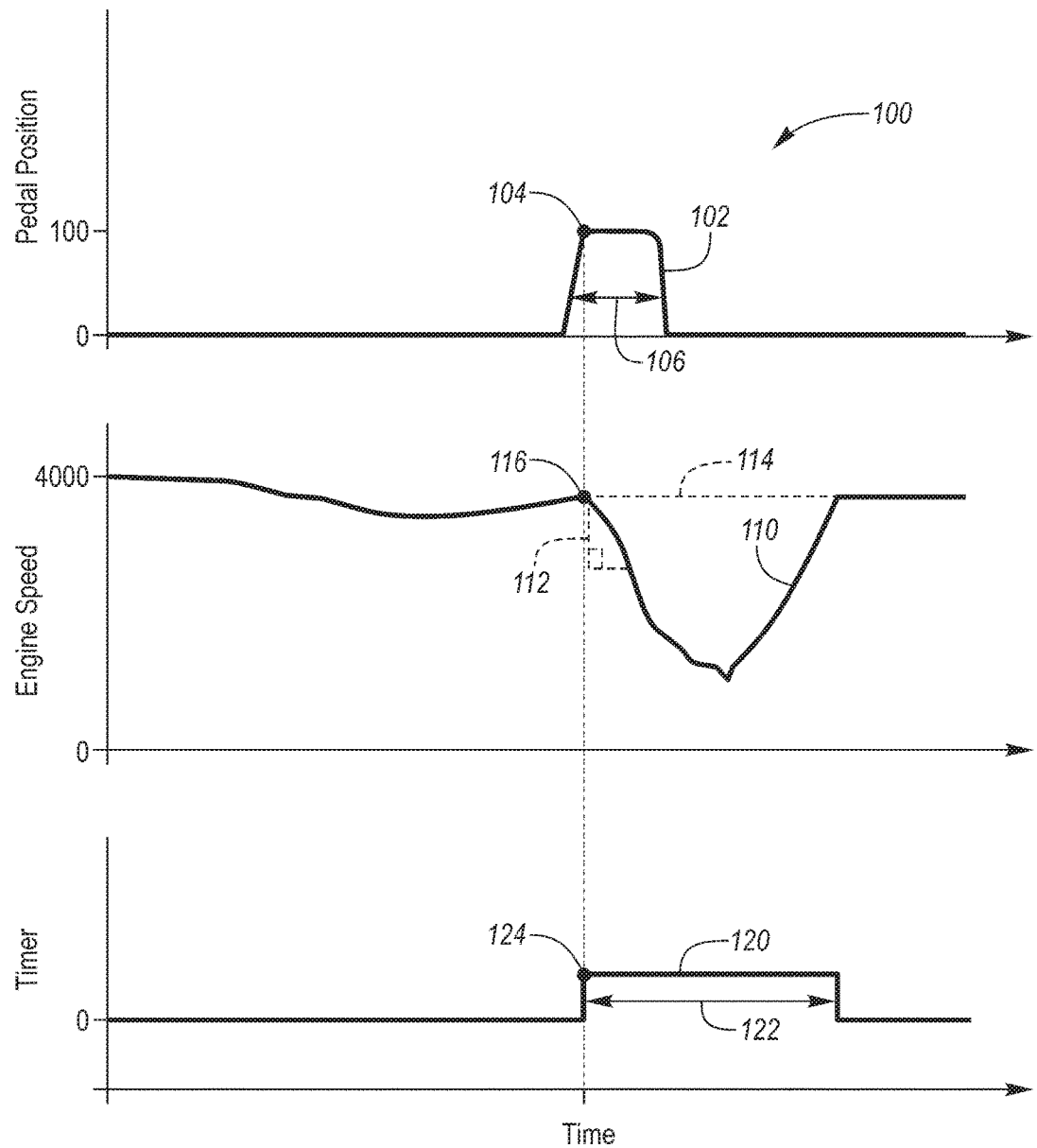
FIG. 2 is a graph including an accelerator pedal tip-in, engine speed reduction, and timer.

FIG. 2 illustrates vehicle accelerator pedal position 102, engine speed 110, and timer 120 status. The accelerator pedal position 102 curve indicates a tip-in event 104 while the vehicle 10 is on a downward grade and speed assist is engaged. The accelerator pedal indicates that the driver may require acceleration. The tip-in event 104 may be determined based on a percent change or a rate of change of the accelerator pedal position 102, indicating a change in demand by the driver. In response to the change in pedal position 102, the controller 38 may be configured to reduce engine speed 110 under normal operation at point 116 as shown. Under normal operation, the engine speed 110 may have a rate of change 112. In response to the tip-in event 104, a timer 120 may be initiated at point 124 having a duration 122. The timer 120 may reduce the rate of change 112 such that the engine speed 110 is maintained, as shown in curve 114. The engine speed 110 may have a reduced rate of change 112 such that the curve 114 is not horizontal. The curve 114 may be positively or negatively linear. The curve 114 may be concave, convex, or a different function altogether. The reduced rate of change 112 may be a function of the timer duration 122 or a function of the tip-in event duration 106, which would accumulate over time.

Figure 3:
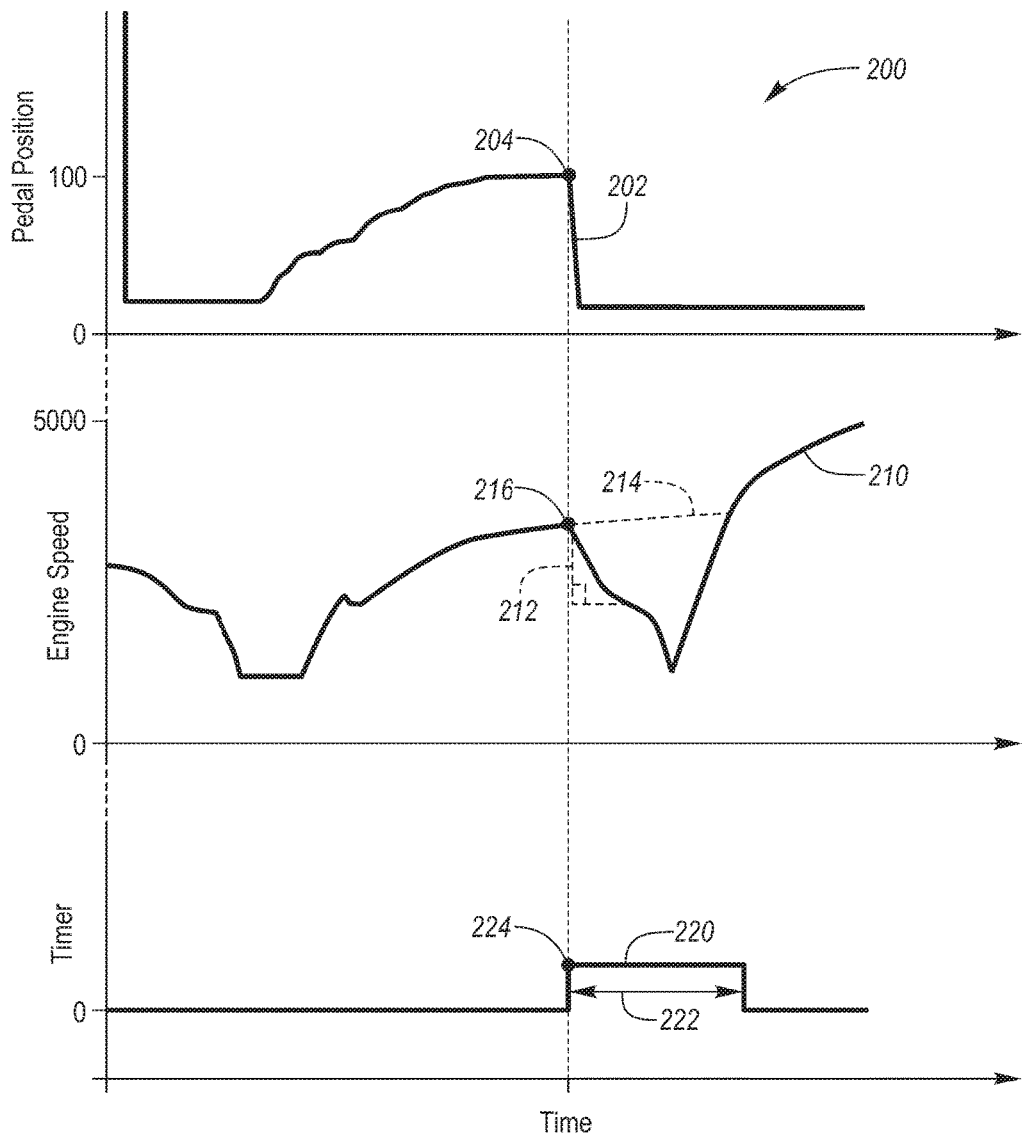
FIG. 3 is a graph including an accelerator pedal tip-out, engine speed reduction, and timer.

FIG. 3 illustrates vehicle accelerator pedal position 202, engine speed 210, and timer 220 status. The accelerator pedal position 202 curve indicates a tip-out event 204 while the vehicle 10 is on a downward grade and speed assist is engaged. The driver may have accelerated down the grade and is now backing off the accelerator pedal. The tip-out event 204 may be determined based on a percent change or a rate of change of the accelerator pedal position 202, indicating a change in demand by the driver. In response to the change in pedal position 202, the controller 38 may be configured to reduce engine speed 210 under normal operation at point 216 as shown. Under normal operation, the engine speed 210 may have a rate of change 212. In response to the tip-out event 204, a timer 220 may be initiated at point 124 having a duration 222. The timer 220 may reduce the rate of change 212 such that the engine speed 210 is maintained, as shown in curve 214. The engine speed 210 may have a reduced rate of change 212 such that the curve 214 is not horizontal. The curve 214 may be positively or negatively linear. The curve 214 may be concave, convex, or a different function altogether. The reduced rate of change 212 may be a function of the timer duration 222.

Figure 4:
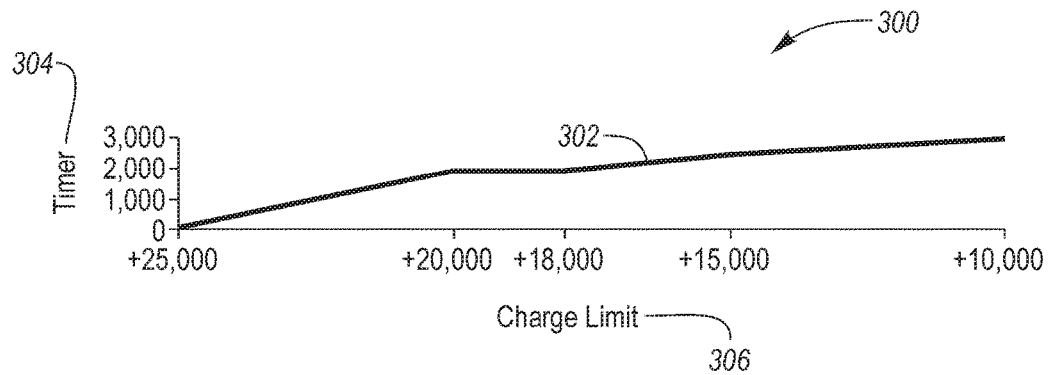
FIG. 4 is a graph including timer duration and charge limits of a traction battery.

FIG. 4 illustrates a graph 300 of timer 304 and charge limits 306. The timer-limit curve 302 discloses timer durations 304 against charge limits 306. The charge limits 306 may be based on the state of charge of the traction battery 36. The charge limits 306 may be based on thermal limits. As shown, a magnitude of the charge limit 306 may be inversely proportional to the duration of the timer 304. The duration of the timer 304 is zero when the charge limit 306 is a maximum charge limit or a charge limit threshold associated with the traction battery 36, which may vary depending on battery manufacturer and model.

Figure 5:
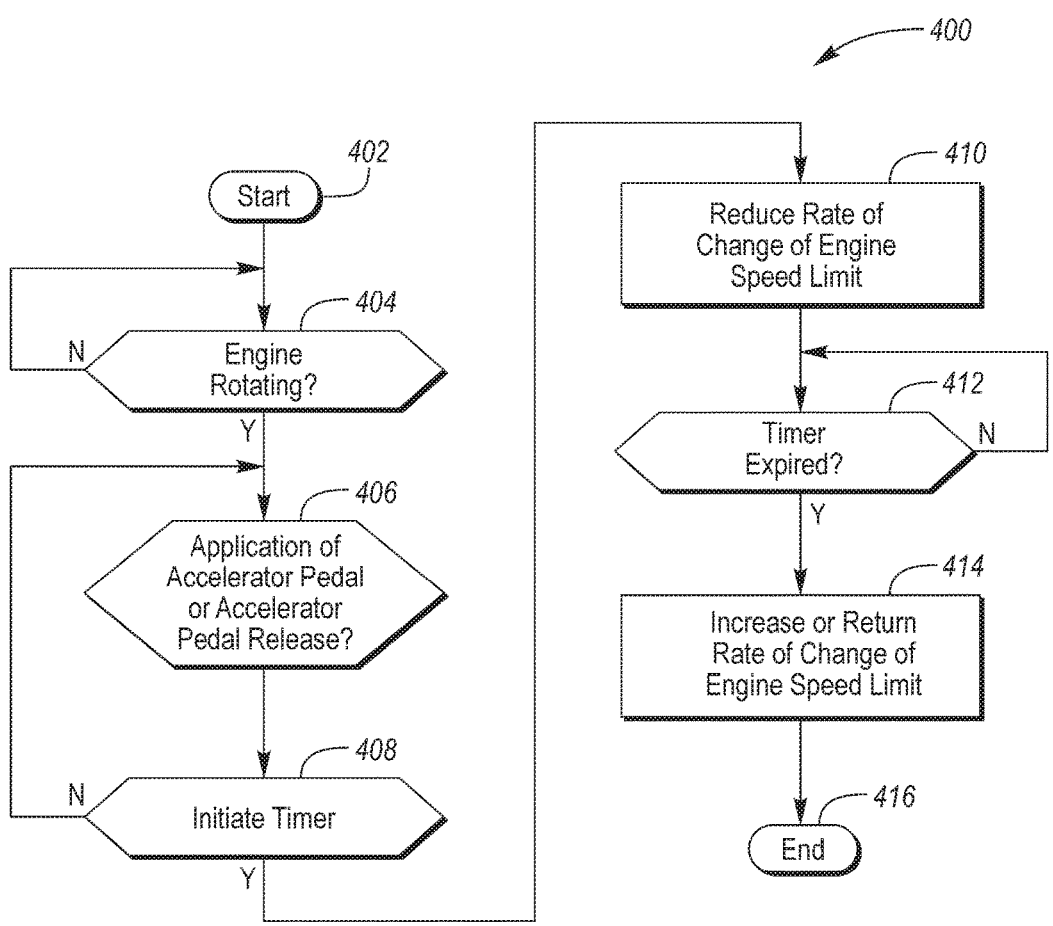
FIG. 5 is a flow diagram of a timer used to reduce a rate of change of the engine speed for a predetermined duration.

FIG. 5 illustrates a flow diagram 400. The flow chart begins at start 402. The controller 38 determines whether the engine 20 is rotating in step 404. In step 406 the controller 38 determines whether an accelerator pedal 40 has been applied or released. Determination of whether the accelerator pedal 40 has been applied or released may be dependent on a percent change of the accelerator pedal position, an absolute position of the pedal crossing a threshold, or a combination thereof. If the accelerator pedal 40 has been applied or released in step 406 a timer 304 may be started in step 408. The start of the timer may be adjusted or delayed to compensate for other environmental factors.

During the timed period 302, the controller 38 may reduce a rate of change of the engine speed limit 110, 210 in step 410. Meaning, the rate of change 112, 212 of the engine speed 20 is limited. In other words, it may be maintained in particular embodiments. For example, the engine may have a particular speed driven by a torque setting of the controller 38. The torque setting may be determined by an accelerator position or environmental factors. In a speed controlled circumstance, the engine speed 110, 210 may change with the position of the accelerator pedal 40. For example, an engine brake torque may be based on the speed 110, 210 of the engine. As engine speed 110, 210 increases, engine braking torque increases. The application of the accelerator pedal in this situation may cause the engine speed 110, 210 to decrease, which would lower the negative torque by the engine 20. Under low charge limit 306 conditions (e.g., a high battery state of charge), engine braking may be anticipated during a downhill decent with vehicle speed control engaged. Therefore, engine speed 110, 210 may be maintained, while engine torque is decreased, to anticipate engine braking in the future. Maintaining the speed 110, 210 of the engine can reduce driver confusion created when the vehicle speed is maintained and the engine speed varies because drivers generally associate engine noise with vehicle speed. The speed 110, 210 of the engine may be maintained for a duration 122, 222 of the timer 304. The rate of change of the speed 110, 210 of the engine may be reduced for a duration 122, 222 of the timer 304. When the timer expires in step 412, the rate of change of the speed of the engine may be changed in step 414. The process may end in step 416 or run continuously.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an engine; and
a controller configured to,
responsive to application of an accelerator pedal during engine braking, start a timer having a duration defined by a charge limit of a traction battery and during which the engine braking is maintained and a predetermined rate of change speed limit of the engine is reduced; and
responsive to expiration of the duration of the timer, increase the predetermined rate of change speed limit.

2. The vehicle of claim 1, wherein the charge limit is based on a state of charge of the traction battery.

3. The vehicle of claim 2, wherein a magnitude of the charge limit is inversely proportional to the duration.

4. The vehicle of claim 3, wherein the duration is zero when the charge limit is greater than a charge limit threshold associated with the traction battery.

5. The vehicle of claim 1, wherein an output torque of the engine increases during the duration.

6. The vehicle of claim 5, wherein the output torque of the engine is offset by an electric motor associated with a powertrain of the vehicle during the duration.

7. The vehicle of claim 6, wherein the electric motor accelerates the vehicle during the duration.

8. The vehicle of claim 1, wherein the predetermined rate of change speed limit is reduced such that a speed of the engine is maintained during the duration.

9. The vehicle of claim 8, wherein the speed is maintained with wheel torque of the vehicle and a reactionary force of a generator.

10. The vehicle of claim 1, wherein the predetermined rate of change speed limit is negative.

11. A vehicle comprising:
an engine; and
a controller configured to,
responsive to an accelerator pedal release during an acceleration of the engine, start a timer having a duration defined by a charge limit of a traction battery and reduce a predetermined rate of change threshold of a speed of the engine; and
responsive to expiration of the duration of the timer, increase the predetermined rate of change threshold.

12. The vehicle of claim 11, wherein the charge limit is based on a state of charge of the traction battery.

13. The vehicle of claim 11, wherein a magnitude of the charge limit is inversely proportional to the duration.

14. The vehicle of claim 13, wherein the duration is zero when the charge limit is a maximum charge limit associated with the traction battery.

15. The vehicle of claim 11, wherein an output torque of the engine decreases during the duration.

16. The vehicle of claim 15, wherein the output torque of the engine is offset by an electric motor associated with a powertrain of the vehicle during the duration.

17. The vehicle of claim 11, wherein the predetermined rate of change threshold is negative.

18. A vehicle comprising:
an engine; and
a controller configured to,
responsive to application of an accelerator pedal during engine braking, start a timer having a duration and maintain a speed of the engine via a wheel torque of the vehicle and a reactionary force of a generator associated with the vehicle; and
responsive to expiration of the duration of the timer, reduce the speed of the engine.

19. The vehicle of claim 18, wherein the duration of the timer is based on a charge limit of a traction battery.

20. The vehicle of claim 18, wherein an output torque of the engine is offset by an electric motor associated with a powertrain of the vehicle during the duration of the timer.

* * * * *